United States Patent [19]

Nunes et al.

[11] E Re. 28,964

[45] Reissued Sept. 14, 1976

[54] ULTRAHIGH STRENGTH STEELS

[75] Inventors: John Nunes, Libertyville, Ill.; Albert D. Martin, Groton, Mass.

[73] Assignee: Brunswick Corporation, Skokie, Ill.

[22] Filed: Sept. 12, 1974

[21] Appl. No.: 505,528

Related U.S. Patent Documents

Reissue of:

[64] Patent No.: 3,698,963
Issued: Oct. 17, 1972
Appl. No.: 73,962
Filed: Sept. 21, 1970

[52] U.S. Cl. ..... 148/12 E; 148/12.4
[51] Int. Cl.[2] ..... C21D 7/02
[58] Field of Search ..... 148/12 E, 12.4

[56] References Cited

UNITED STATES PATENTS

| | | | |
|---|---|---|---|
| 2,553,706 | 5/1951 | Goller | 148/12.3 |
| 2,553,707 | 5/1951 | Goller | 148/12.3 |
| 2,795,519 | 6/1957 | Angel et al. | 148/12.4 |
| 3,152,934 | 10/1964 | Lula et al. | 148/12.3 |
| 3,250,611 | 5/1966 | Lula et al. | 148/12.3 |
| 3,359,094 | 12/1967 | Bieber et al. | 148/37 |
| 3,395,528 | 8/1968 | Lucht | 57/145 |

*Primary Examiner*—W. Stallard
*Attorney, Agent, or Firm*—John G. Heimovics; John J. Connors; David S. Guttman

[57] ABSTRACT

An ultrahigh strength material made from ordinary 18–8 stainless steel has a tensile strength in excess of 400,000 p.s.i. The method of producing the ultrahigh strength is accomplished by thermo-mechanical operations. The material can have any desired geometric cross section configuration and is adaptable for use as a spring material.

17 Claims, 8 Drawing Figures

INVENTORS
John Nunes
Albert D. Martin
John G. Heimovics ATTORNEY

ULTRAHIGH STRENGTH STEELS

Matter enclosed in heavy brackets [ ] appears in the original patent but forms no part of this reissue specification; matter printed in italics indicates the additions made by reissue.

BACKGROUND OF THE INVENTION

Field of the Invention

This invention is in the field of high strength steels and, more particularly, in the field of ultra-high strength 18–8 stainless steel materials.

Description of the Prior Art

With the invention of adding approximately 18% chromium and 8% nickel to a relatively carbon-free iron, rustless steel or stainless steel was born. Since that early development in the 1910's, many modifications and permutations have been made of the basic 18–8 stainless steel. Later, this basic material was classified as an austenitic stainless steel because other classes of stainless steels that were not austenitic were coming into existence. Even more recently, all the stainless steels have been reclassified with this early group of 18–8 stainless steels now referred to as AISI type 300 series stainless steels. The basic 18–8 stainless steel is now generally referred to as AISI type 302 stainless steel.

Type 302 stainless exhibits an austenitic structure and cannot be readily or appreciably transformed by heat treatment only into a substantially martensitic structure. However, many attempts have been tried to make type 302 stainless steel stronger and harder primarily by exotic heat treatments without altering the oxidation and corrosion resistance thereof. In retrospect, it was not expected that such attempts would work and in essence they have not worked. However, type 302 stainless steel and special compositions thereof have been strengthened by cold work with achievable results indicating strength up to a maximum of 355,000 p.s.i. for standard type 302 stainless and 380,000 p.s.i. for special compositions thereof. These special compositions constituting small, chemical changes do not significantly alter the structure of the material.

On the other hand, drastic alterations in chemical compositions have been introduced substantially increasing the strength of stainless steel materials, yet changing the oxidation and corrosion resistance thereof. In some instances, additional materials were, of necessity, added to these compositions to restore the oxidation and corrosion resistance characteristics. The result of these changes have created new families of stainless steels, which are far more expensive and more limited in their particular scope of usage than the basic type 302 stainless.

The 355,000 p.s.i. to 380,000 p.s.i. strength levels achievable in current type 302 stainless steel alloys are far below the strength levels achievable in the highest strength alloy steel materials usable for springs. Some of these alloy steels are used to make fine springs, yet are not conducive for use in oxidizing or other corrosive atmospheres. Consequently, it has long been recognized that it would be extremely desirable to extend the strength range of type 302 stainless steel to provide a good, general high strength stainless steel material that could be used for springs, such as in oxidizing or corrosive atmospheres.

SUMMARY OF THE INVENTION

This invention relates to oxidation and corrosion resistant steels, and is concerned with new and improved characteristics of 18–8 stainless steel alloys that provide ultra-high strength levels from over 400,000 p.s.i. to over 600,000 p.s.i. This invention also relates to a new and improved thermo-mechanical method of treating such 18–8 stainless steels to achieve these ultra-high strength levels.

Briefly, an 18–8 stainless steel material is subjected to a series of deformation hardening operations always performed below the recrystallization temperature for the material with intermediate anneals. Subsequently, the material is deformation hardened to a very high level of cold work, over 85%. The material is further processed by being subjected to an intermediate heat treatment to inhibit dynamic recovery, and to obtain an aging response thereby enhancing the strength already achieved from the deformation hardening. The material can be further deformation hardened with intermediate heat treatments to again increase the strength to higher levels, yet still exhibiting excellent oxidation resistance at temperatures in the 500° F. range. Thus, such materials will provide excellent spring characteristics and oxidation resistance hitherto unknown in 18–8 stainless steel spring materials.

It is an object of this invention to provide an 18–8 stainless steel with a strength level in excess of 400,000 p.s.i., yet retaining the oxidation and corrosion resistance that is exhibited by this material in its normal cold-worked state.

It is another object of this invention to provide a method for processing 18–8 stainless steel to ultra-high strength levels by thermo-mechanical treatment of the material.

It is a feature of the invention to provide such ultra-high strength 18–8 stainless steel materials to be used as springs.

It is another feature of this invention to provide an 18–8 stainless steel material having an ultra-high strength in cross-sectional configurations as desired, e.g., circles, squares, rectangulars, I-shapes, elongated rectilinear shapes, T-shapes, etc.

Still another feature of the invention is to provide an ultra-high strength 18–8 stainless steel material in an operating range up to about 500° F. yet retaining good oxidation resistance.

Yet another feature of the invention is to provide a plurality of 18–8 stainless steel filaments, each having a tensile strength in excess of 400,000 p.s.i.

Another feature of the invention is to provide a composite material having the plurality of 18–8 stainless steel filaments surrounded by metal matrix material, said composite exhibiting a tensile strength in excess of 400,000 p.s.i.

Another feature of the invention is to provide an 18–8 stainless steel wire having an ultra-high strength with a corrosion resistant covering superior to the core stainless steel.

The above and other and further objects and features of the invention will be more readily understood by reference to the following detailed description and the accompanying drawing.

DESCRIPTION OF THE PREFERRED EMBODIMENTS

In a preferred embodiment of this invention, an 18–8 stainless steel core material having a cross-sectional configuration such as a circle, a square, a rectangle, a hexagon, an I-shaped, an elongated rectilinear shape, etc., is clad or sheathed with a metal such as a nickel-copper alloy, type 310 stainless steel nickel base superalloys, cobalt base superalloys, nickel-cobalt alloys, copper base alloys, lead, titanium and its alloys, to form a composite. The composite is then reduced in cross section so that the sheath tightly adheres to the core. When it is desired that the distortion of a core shape be held to a minimum, then the interior of the sheath should conform to the exterior of the core. The cold deformation may be performed by drawing, swaging, rolling, pressing, squeezing, etc., or any desired combination thereof.

As defined for use in this disclosure, type 302 stainless steel (18–8 stainless steel) has the following approximate chemical analysis by weight:

| | Percent |
|---|---|
| Carbon | .01–.15 |
| Chromium | 17–19 |
| Copper | 0–.5 |
| Manganese | 0–2 |
| Molybdenum | 0–.9 |
| Nickel | 7–10 |
| Phosphorus | 0–.04 |
| Silicon | 0–1.5 |
| Sulfur | 0–.03 |
| Iron | Balance |

which is substantially the same as the United States Government's AMS Specification. All constituent elements, except for carbon, that are present in less than one percent quantities are considered and characterized as minor elements for the purpose of this disclosure. In addition, the percent reduction, the percent cold deformed state, the percent cold worked state, etc., are all the same as the percent reduction in cross sectional area of the material after the last anneal. In other words, a 97.6% cold worked state is the same as a 97.6% reduction in cross sectional area.

Figure 1:
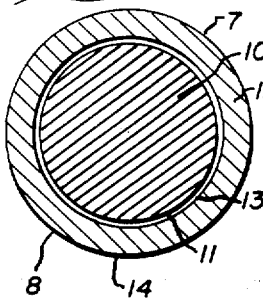
FIG. 1 is a cross sectional view of a circular tube surrounding a circular wire.
Figure 2:
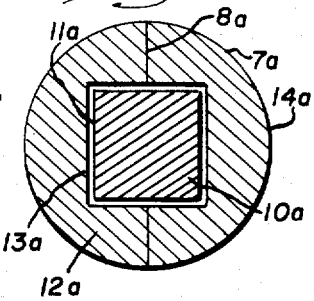
FIG. 2 is a cross sectional view of a sheathing material having a circular external configuration surrounding a core material having a square external configuration.
Figure 3:
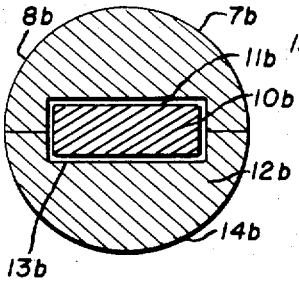
FIG. 3 is a cross sectional view of a sheathing material having a circular external configuration surrounding a core material having a rectangular external configuration.
Figure 4:
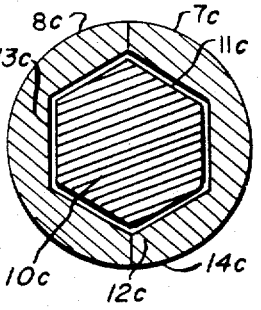
FIG. 4 is a cross sectional view of a sheathing material having a circular external configuration surrounding a core material having an hexagonal external configuration.
Figure 5:
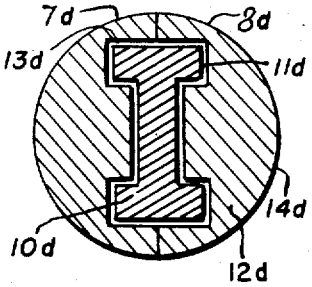
FIG. 5 is a cross sectional view of a sheathing material having a circular external configuration surrounding a core material having an I-shaped external configuration.
Figure 6:
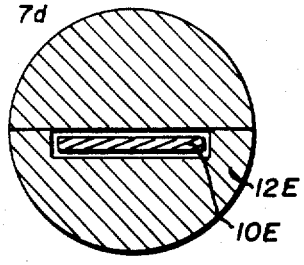
FIG. 6 is a cross sectional view of a sheathing material having a circular external configuration surrounding a core material having an elongated external configuration.
Figure 7:
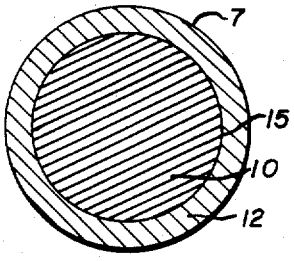
FIG. 7 is a cross sectional view of the configuration of FIG. 1 wherein the sheath is drawn down tightly on the core material and having an interface designated therebetween.

It has been found that it is easier to reduce the cross section of the composite when the exterior of the sheath is substantially circular, however, other external configurations of the sheath may be used as desired. The substantially circular exterior cross section 8 of such a composite 7 configuration is shown in FIG. 1 wherein the core 10 is surrounded by a sheath 12 and the exterior surface 11 of the core 10 is substantially circular and adjacent the interior surface 13 of the sheath 12. In a similar manner, the cross-sectional composite configurations for a square 10A, a rectangle 10B, a hexagon 10C, an I-shape 10D, and an elongated rectangle 10E, are shown in FIGS. 2 through 6. The sheath 12 is reduced in size tightly on the core to prevent any relative movement between the core 10 and the sheath 12 with an interface 15 provided to promote equal reduction of the core 10 and the sheath 12, as shown in FIG. 7.

The ratio of the sheath material to the core material depends upon the types of materials and configuration. Approximately a 5 to 10% reduction in area is required to provide the initial tight mechanical bond between the sheath 12 and the core 10. When the core 10 is made of a material such as type 302 stainless steel, and the sheath is made of the material such as a nickel-copper alloy, the composite is annealed in a heat treating furnace at a rate of approximately two seconds per mil of diameter of the composite. The annealing or recrystallization temperature must be sufficiently high to provide a complete solution anneal of the core. For the type 302 stainless and steel nickel-copper alloy composite, 1950° F. is sufficient to provide the solution anneal and cause a minor degree of diffusion bonding to occur between the core 10 and the sheath 12 at the interface 15 further insuring that there will be no relative movement between the core and the sheath. The composite is rapidly quenched as it leaves the annealing furnace preventing carbide precipitation in the microstructure of the stainless steel.

The composite is then subjected to a series of cold reducing steps with intermediate anneals wherein the composite's area is reduced at least 75% by cold deformation and preferably 85% by cold deformation after the last anneal. Each of the intermediate anneals is performed above the recrystallization temperature of the core material. However, this temperature should be kept as low as possible to prevent extensive diffusion between the core and sheathing materials. It is believed that the extreme amount of cold deformation is enhanced because the sheathing supports the core material, provides a protective coating and functions as a lubricant. This particular step in the process is extremely important, and heretofore has not been recognized as one of the primary steps necessary to provide the ultra-high strength material having complicated geometric cross sectional configurations. It is believed that for simple geometric shapes, such as an elongated rectangle, a square, a circle, etc., that the cladded sheath is not required, however, it can be used, if desired.

At this stage in the processing, three different series of operations may be employed, depending on the desired final strength of the core material.

In one preferred embodiment, the 75–84% cold deformed composite is heated for approximately four hours (with the permissable time ranging from about one-half hour to about sixteen hours or more) at a temperature well below the lowest recrystallization or transformation temperature of the core material; for type 302 stainless material, the range would be about 700° F. to 825° F., and preferably in a narrower range of about 775° F. to 800° F. For ease in understanding and as used hereinafter, the sub-transformation temperature of the core material refers to a temperature at which substantially no recrystallization of the microstructure will occur. This sub-transformation temperature is also called a stress relieving temperature. Subsequently, the 84% cold deformed composite is additionally cold deformed to as much as 97%, wherein the core material has a tensile strength in excess of 500,000 p.s.i. If desired, the sheath can be removed from the core such as by chemical dissolution and other methods well known in the art. When the sheath is a nickel-copper alloy, chemical dissolution in nitric acid is quite satisfactory. If the sub-transformation heat treatment is omitted, then the material at a 97% cold deformed state would exhibit a tensile strength in excess of 400,000 p.s.i.

In another preferred embodiment of the invention, the 84% cold deformed composite is further cold deformed to approximately 93% to 94%. The composite is heat treated at the sub-transformation temperature range of 700° to 825° F. for an approximate period of time such as four hours. The composite is subsequently cold deformed to 98% and again heat treated at the sub-transformation temperature range of 700° F. to 825° F. for an approximate period of time, such as four hours. The sheath can be removed as described above, with the core having a resulting tensile strength ranging from approximately 500,000 p.s.i. to approximately 580,000 p.s.i.

In still another embodiment of the invention, the 84% cold deformed composite was further drawn to a 97.6% cold deformation state. The composite is heat-treated at the sub-transformation temperature of about 700° F. to 825° F. for approximately four hours. The composite is then additionally cold deformed to a 98.7% state. The core material exhibited a tensile strength of about 575,000 p.s.i. to 600,000 p.s.i. This composite is then heat-treated a second time at a sub-transformation temperature, the same as above, for approxiamtely about 4½ hours. The core material then exhibited a tensile strength in excess of 600,000 p.s.i.

In another embodiment of the invention, the 84% cold deformed composite is further cold deformed to approximately 97% or more. The composite is then heat treated at the sub-tranformation temperature ranging from 700° F. to 825° F. After the sheath is removed similar to the manner described above, the core has a resultant tensile strength varying from 475,000 p.s.i. to 525,000 p.s.i.

In another embodiment of the invention it is possible to form a plurality of ultra-high strength metal filaments bu substituting the composite as taught herein for the wire-sheath composite structure of U.S. Pat. No. 3,277,564, U.S. Pat. No. 3,394,213, and/or U.S. application Ser. No. 6,709, all owned by the assignee hereof. The teachings of both of these patents are fully incorporated by reference herein, and are adaptable for use in forming a plurality of ultra-high strength stainless steel filaments in accordance with the combined teachings thereof. Depending on the final application, it is not necessary to remove the matrix, thereby the end product being a composite of ultra-high strength filaments of any desired configuration surrounded by a metal matrix.

The following examples of specific ultra-high strength steels made in accordance with this invention should not be construed in any way to limit the scope contemplated by this invention.

EXAMPLE I

A type of 302 stainless steel rod having a 0.080 inch diameter and an approximate chemical analysis by weight of:

| | Percent |
|---|---|
| Carbon | .09 |
| Silicon | 1.23 |
| Manganese | 1.14 |
| Phosphorus | .021 |
| Sulfur | .010 |
| Chromium | 16.9 |
| Nickel | 8.00 |
| Molybdenum | .7 |
| Nitrogen | .045 |
| Iron | Balance |

and was surrounded by a Monel K sheath having a 0.115 inch outside diameter, 0.100 inch inside diameter, and a chemical analysis of nickel, 66%; copper, 29%; and aluminum, 3%. The rod-sheath composite was drawn through a 0.091 inch diameter wire drawing die. The composite was solution annealed at 1950° F. at a rate of two seconds per mil of diameter of the composite and rapidly quenched. The composite was cold drawn through a series of dies with intermediate anneals to a 97.6% cold worked state. The composite was then heat treated at a sub-transformation temperature of about 795° F. for approxiately four hours. The sheathing material was removed and the resulting stainless wire exhibited a tensile strength of 540,100 p.s.i.

EXAMPLE II

Same as Example I except that after the sub-transformation heat treatment of the composite, the composite was further cold drawn from the 97.6% state to a 98.7% state of cold work. The sheathing material was then stripped from the composite and the resultant stainless steel rod exhibited a tensile strength of 592,000 p.s.i. Prior to removing the sheathing the tensile strength was 472,800 p.s.i. with the Monel acting as corrosion resistance coating.

EXAMPLE III

Same as Example II except that a final heat treatment at a sub-transformation temperature of 795° F. for approximately 4½ hours was employed. The sheathing material was then removed from the composite, and the stainless steel wire exhibited a tensile strength of 608,000 pounds per square inch.

EXAMPLE IV

A type 302 stainless steel rod having a 0.080 diameter and an approximate chemical analysis by weight of:

| | Percent |
|---|---|
| Carbon | .09 |
| Silicon | 1.23 |
| Manganese | 1.14 |
| Phosphorus | .021 |
| Sulfur | .010 |
| Chromium | 16.9 |
| Nickel | 8.00 |
| Molybdenum | .7 |
| Nitrogen | .015 |
| Iron | Balance |

and was surrounded by a Monel K sheath having a 0.115 inch outside diameter, 0.100 inch inside diameter, and a chemical analysis of nickel, 66%; copper, 29%; and aluminum, 3%. The rod-sheath composite was drawn through a 0.091 inch diameter wire drawing die. The composite was solution annealed at 1950° F. at a rate of two seconds per mil of diameter of the composite and rapidly quenched. The composite was cold drawn through a series of dies with intermediate anneals prior to achieving a 99.4% cold worked state. The composite was then stripped of its sheathing material and exhibited a tensile strength of 535,500 p.s.i.

EXAMPLE V

The same as Example IV except that after the sub-transformation heat treatment of the composite, the composite was further cold worked from a 99.4% cold work state to a 99.6% cold work state. The sheathing material was removed therefrom, with the final stainless steel wire exhibiting a tensile strength of 619,000 pounds per square inch.

EXAMPLE VI

Ninety-one (91) type 302 stainless steel rods, each having a diameter of 0.080 inch were placed in Monel 400 tubes, each having a 0.115 inch outside diameter and a .100 inch inside diameter. The chemical composition of the 302 stainless steel by weight was:

| | Percent |
|---|---|
| Carbon | .10 |
| Silicon | .46 |
| Manganese | .5 |
| Chromium | 18.9 |
| Nickel | 8.9 |
| Phosphorus | .018 |
| Sulfur | .008 |
| Iron | Balance |

The rod-like combinations were packed in a mild steel billet, heated, evacuated to about $10^{-5}$ torr and sealed. The billet was heated and extruded at 1800° F. with a 16 times reduction forming a composite. The composite was then reduced by cold reduction with intermediate anneals. The composite was fully annealed at a rate of two seconds per mil diameter of the composite. The composite was then cold drawn to a final diameter of 16.8 mils with each of the individual rods (now filaments) having an effective cross section diameter of about 1.13 mils. The filaments were at a 93.8% cold worked state. The strength of the 302 stainless steel filaments was found to be 393,200 p.s.i. The composite was then heat treated at a sub-transformation temperature of about 700° F. for about 16 hours. The final strength of the 302 stainless steel filaments was then found to be 427,500 p.s.i.

EXAMPLE VII

Same as Example VI except that the composite was cold drawn to a 98.5% cold worked state. The final composite diameter was 16.8 mils with each of the individual filaments having an effective cross section dimension of about 1.13 mils. The strength of the 302 stainless filaments was found to be 453,700 p.s.i. The composite was then heat treated at a sub-transformation temperature of about 700° F. for approximately 16 hours. The final strength of the filaments was found to be 512,200 p.s.i.

It has been found that during the different variations in processing that the austenite that originally existed in the core material transformed into at least 50% martensite by a diffusionless phase transformation. The sheathing material is preselected to have a cold deformation rate that is compatible with the cold deformation rate of the core material. It is believed that the additional treatment at the sub-transformation temperature range further inhibits dynamic recovery and obtains an aging response thereby enhancing the strength already achieved from the deformation hardening. After the sheathing is removed, the ultra-high strength core material may be subjected to a final sizing operation to obtain a uniform cross sectional geometry.

Figure 8:
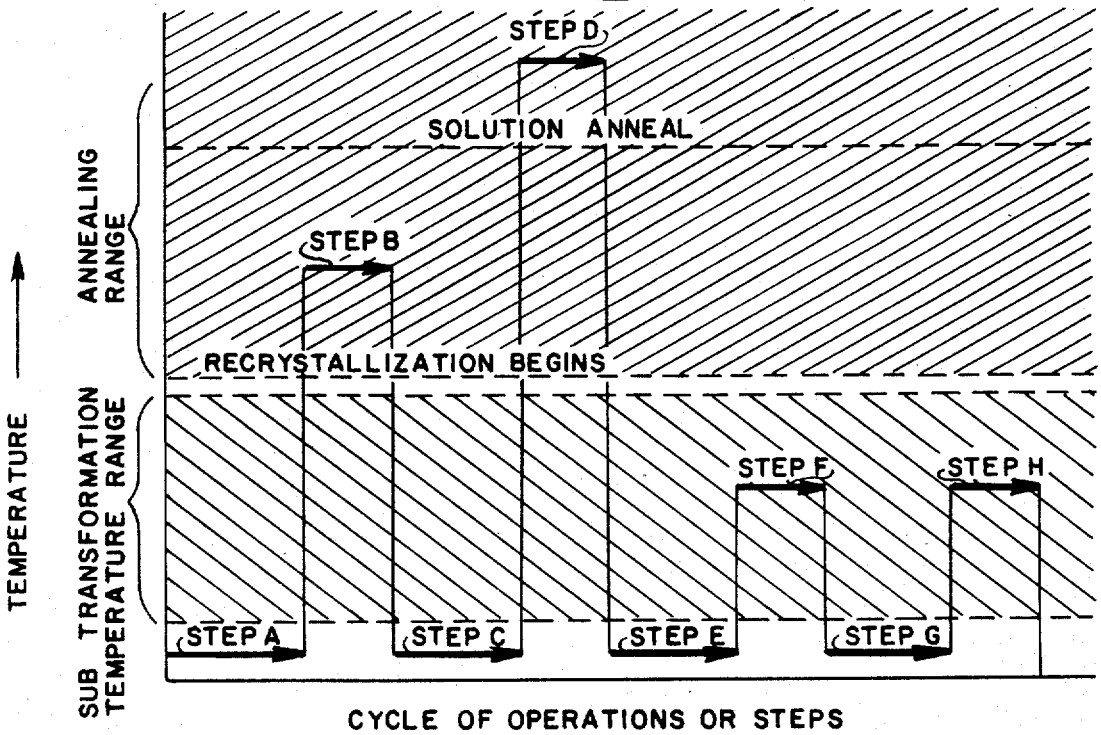
FIG. 8 is a schematic flow chart of the process utilized in producing the high strength stainless steel material.

The general processing steps or operations are graphically depicted in FIG. 8. The ordinate denotes the heat treatment range in temperature and the abscissa depicts the cycle of operations or steps. Operations A and C indicate cold deforming operations with B indicating an intermediate anneal. Operations indicated as A, B and C are size reducing operations and can be repeated any number of times. D indicates the solution anneal of the core material. E indicates the amount of cold work reduction measured in prcentages. F indicates the first sub-transformation anneal with G indicating subsequent cold reduction. Lastly, H indicates the final sub-transformation anneal.

It can readily be seen that the ultra-high strength materials can be coiled for use in springs, either as tension or compression springs. In addition, spiral type watch springs, leaf springs, etc., can also be made from this material exhibiting such high tensile strength.

Although specific embodiments of the invention have been described, many modifications and changes may be made, especially in configurations, without departing from the spirit and scope of the invention as defined in the appended claims.

We claim:

1. A high strength stainless steel material having a composition by weight consisting essentially of .15% maximum carbon, 1.5% maximum silicon, 2% maximum manganese, about 17% to about 19% chromium, about 7to about 10% nickel, minor amounts of other metals, and the balance constituent iron, and characterized in that said material has a tensile strength in excess of 400,000 p.s.i.

2. The material of claim 1 wherein said material exhibits approximately not more than a 20% decrease in strength up to approximately 500° F.

3. The material of claim 1 wherein the material has a preselectedly sized configuration.

4. The material of claim 1 which is formed into a spring.

5. The material of claim 1 further including a tightly adhering sheath material.

6. The material of claim 5 which is formed into a spring.

7. A method of obtaining a tensile strength of at least 400,000 p.s.i. from an 18–8 stainless steel material closely controlling the steps comprising:

(1) rapidly quenching a solution annealed 18–8 stainless steel material to prevent carbide precipitation, (2) cold deforming and material to at least a 75% cold worked state; and (3) heat treating said cold deformed material at a sub-transformation temperature to inhibit dynamic recovery and provide an increase in strength.

8. The method of claim 7 further including the step of cold deforming said material subsequent to said heat treating.

9. The method of claim 7 wherein the sub-transformation heat treatment temperature ranges from 775° F. to 800° F.

10. The method of claim 7 wherein the material is further worked to an 84% cold worked state during cold deforming.

11. The method of claim 7 wherein the material is further worked to a 95% cold work state during cold deforming.

12. The method of claim 7 wherein the material is further cold worked to at least a 97.6% cold work state during cold deforming.

13. The method of claim 12 wherein after the sub-transformation temperature heat treatment the material is further cold worked to at least a 98.7% cold worked state with the material exhibiting a tensile strength in excess of 575,000 p.s.i.

14. A method of obtaining a tensile strength of at least 400,000 p.s.i. from an 18–8 stainless steel material comprising the steps of:

(1) rapidly quenching a solution annealed 18–8 stainless steel material to prevent carbide precipitation; and (2) cold deforming said material to at least a 97% cold worked state.

*15. A process for thermo-mechanically treating 18–8 stainless steel, comprising the steps of:*

*(a) cold deforming the 18–8 steel,*

*(b) heating the steel to a temperature in the sub-transformation temperature range of 700°F to 825°F to prevent carbide precipitation, and*

*(c) cooling the steel to a temperature below about 700°F and then again cold deforming the steel, the 18–8 steel totally being deformed a minimum of 75%.*

*16. A process for thermo-mechanically treating 18–8 stainless steel, comprising the steps of:*

*(a) heating the steel to a temperature in the recrystallization temperature range to anneal said steel,*

*(b) cooling the steel to a temperature range of 700°F to 825°F and then cold deforming said steel,*

*(c) heating the steel to a temperature in the sub-transformation temperature range, and*

*(d) cooling the steel to a temperature below about 700°F and then again cold deforming the steel, the 18–8 steel totally being cold deformed a minimum of 75%.*

*17. The process of claim 15 wherein the total amount of deformation is in excess of 75%.*

* * * * *